US008335429B2

(12) United States Patent
Campbell

(10) Patent No.: US 8,335,429 B2
(45) Date of Patent: Dec. 18, 2012

(54) NETWORK TERMINATION APPARATUS

(75) Inventor: Malcolm D Campbell, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 689 days.

(21) Appl. No.: 12/282,405

(22) PCT Filed: Feb. 23, 2007

(86) PCT No.: PCT/GB2007/000649
§ 371 (c)(1),
(2), (4) Date: Sep. 10, 2008

(87) PCT Pub. No.: WO2007/104918
PCT Pub. Date: Sep. 20, 2007

(65) Prior Publication Data
US 2009/0097845 A1    Apr. 16, 2009

(30) Foreign Application Priority Data
Mar. 13, 2006 (EP) .................................. 06251310

(51) Int. Cl.
*H04B 10/08* (2006.01)
*H04J 14/00* (2006.01)
(52) U.S. Cl. ............................................ 398/17; 398/71
(58) Field of Classification Search .................. 330/9, 17, 330/71, 140, 182, 202; 398/9, 17, 71, 140, 398/182, 202
See application file for complete search history.

(56) References Cited

U.S. PATENT DOCUMENTS

| | | | | |
|---|---|---|---|---|
| 5,599,190 A * | 2/1997 | Willette | .......................... | 439/49 |
| 6,201,920 B1 | 3/2001 | Noble et al. | | |
| 6,344,911 B1 * | 2/2002 | Dailey et al. | .................... | 398/82 |
| 6,496,641 B1 * | 12/2002 | Mahony | ....................... | 385/135 |
| 2001/0036351 A1 | 11/2001 | Fritz | | |
| 2005/0006124 A1 | 1/2005 | Kurse | | |
| 2005/0094959 A1 * | 5/2005 | Sibley et al. | ................... | 385/135 |
| 2005/0232565 A1 | 10/2005 | Heggestad et al. | | |

FOREIGN PATENT DOCUMENTS

| | | |
|---|---|---|
| EP | 0 828 356 | 3/1998 |
| EP | 0 828 356 A2 | 3/1998 |
| EP | 1 001 293 | 5/2000 |
| EP | 1 001 293 A2 | 5/2000 |
| EP | 1 203 974 A2 | 5/2002 |
| EP | 1 626 300 | 2/2006 |
| EP | 1 626 300 A1 | 2/2006 |
| JP | 08-146238 | 6/1996 |
| JP | 2003098362 A | 4/2003 |
| WO | 2005/096054 | 10/2005 |
| WO | WO 2005/096054 | * 10/2005 |

OTHER PUBLICATIONS

International Search Report for PCT/GB2007/000649, mailed May 4, 2007.
Patent Abstracts of Japan, vol. 1996, No. 10., Oct. 31, 1996.
Novelty Search dated Oct. 3, 2005 in SE 2005 04269.
European Search Report dated May 23, 2006 in EP 06 25 1310.

* cited by examiner

*Primary Examiner* — Armando Rodriguez
(74) *Attorney, Agent, or Firm* — Patterson Thuente Christensen Pedersen, P.A.

(57) ABSTRACT

Apparatus for connecting telecommunications equipment of premises to a telecommunications network, the apparatus comprising a first module associated with the telecommunications equipment, a second module associated with the telecommunications network, the first module connectable to the second module by a telecommunications link, and access means permitting access to only one of either the first module or the second module.

24 Claims, 11 Drawing Sheets

NETWORK TERMINATION APPARATUS

This application is the U.S. national phase of International Application No. PCT/GB2007/000649 filed 23 Feb. 2007 which designated the U.S. and claims priority to EP 06251310.6 filed 13 Mar. 2006, the entire contents of each of which are hereby incorporated by reference.

This invention relates to apparatus and methods for the connection of premises with an external telecommunications network, in particular the network termination equipment to terminate a cable of an external access network at customer premises, in the context of bringing fibre to the premises (FTTP).

Public switched telecommunication networks currently comprise a network of cables routed through a number of exchanges. These cables can comprise a combination of optical fibre (the core network and exchanges) and traditional copper pairs (often the "last mile" to customer premises). These cables of the external network ultimately terminate at network termination equipment points (NTEs) located on the distribution side customer premises. The core network is now in the UK composed primarily of optical fibre. The last mile of the network to customer premises traditionally comprised twisted copper pairs, which has proved to be a transmission and reliability choke point. For that reason, many commercial and industrial entities have since migrated to optical fibre over the "last mile". For reasons of cost (in the main), the last mile connection of most private or residential customers still comprises twisted pairs. However with demand in the UK for greater telecommunications bandwidth from residential customers, the plan is to migrate most premises to FTTP. It is foreseen that huge amounts of fibre and related equipment will be installed into an enormous number of premises.

Compared to copper-based systems, FTTP will bring to the premises a greater quantity of more complicated and delicate electrical and electronic equipment. While a copper termination typically comprises little more than a wire terminating at an NTE (such as an NTE5 master linebox, in the UK), optical termination apparatus (in the form of e.g. an optical network termination (ONT) module) is considerably more complex.

One quality of optical fibre is that it has a minimum bend radius, unlike copper wire, which can literally be bent double with little effect on its performance (at telephony and current data rates), requiring only e.g. an NTE5 linebox for termination. More equipment (e.g. in the form of splice trays and bend management devices) is required when dealing with optical fibre. There is also other equipment—such as a power supply for the equipment, twisted pair cables, co-axial cables, and the like required to support the optical connection to the premises.

In spite of its greater complexity however, user-friendly, preferably "plug and play"-type equipment for FTTP would be an advantage to residential users who are generally not, or do not have a team of, IT experts capable of tending to the optical fibre and equipment. Customers also may not need or want the full capabilities available from an optical connection to the home. There are others who will not bear the cost of upgrading to a full optical system including unnecessary and unwanted optical bells and whistles. At the same time, some way of future-proofing the installation would be an advantage. Different customers will have different needs at the point of installation, as well as over time. Allowing customers the capability to upgrade (or downgrade) their telecommunications setup themselves (or by a provider of their choice) at minimal cost and disruption would undoubtedly be a boon.

At the same time, it is crucial to the network operator to ensure that customers cannot disrupt the operation of the external network to interfere with the transmissions, optical fibre and equipment of the external network. For example, a problem at the premises could affect the network operator's ability to monitor end to end performance, and to monitor data and service flows within the network. A particular concern is the standard of DIY installation work. UK network service operators such as BT plc are obliged to ensure that "lifeline" voice services at a minimum are always available, under the Universal Service Obligations (administered by Ofcom, the UK regulator and competition authority for communications industries), so unbroken connectivity is of crucial importance to network operators.

There are also health and safety issues in dealing with an optical fibre installation. For example, transmission through an optical fibre may present a laser hazard affecting eyesight. If the glass fibre is over-bent, it could break or shatter into dangerous shards or sharp fragments. A solution is required to protect the customer against such dangers when dealing with the equipment e.g. when the customer is upgrading or customising the network within the premises.

The FTTP equipment of the external network also needs to be sufficiently robust and reliable so that minimal maintenance is required. It is expected that the external network operator will—as they are now—be legally responsible for the operation of the external network up to and including the ONT, and with plans to bring FTTP to virtually every set of premises in the country, the burden of maintaining an unreliable system would be intolerable on such a scale. Bearing in mind the fragility of optical fibre, fibre connections, and optical equipment however, it is important to ensure that diagnosis, testing and monitoring activity can be carried out to ensure continued connectivity, as discussed above. When such maintenance or testing work is required, it is desirable that it be done with minimal disruption to the customer.

Customers with copper terminations are, unfortunately, used to disruption. This is a real problem resulting in lost time and occasionally creating ill-will. The terminating of a copper wire at premises currently consists of drilling a hole through the outer wall of the customer premises and passing the wire through, then terminated within the premises at e.g. an NTE5 master linebox. As its name suggests, the NTE typically marks the legal extent of the authority and legal responsibility of the external network operator. Such termination boxes serve to cover the raw access hole on the interior wall, are either surface- or flush-mounted, and include a socket on the faceplate for compatible connector plugs such as a BT431A connector for telephones. The raw drill hole on the external wall is plugged up using a mastic sealant or with a cover plate screwed to the wall around the ingoing wire.

In most cases, an engineer of the external network operator makes an appointment with the customer to enter the premises. Due to factors outside either parties' control, appointments are often missed, leading to much frustration and lost goodwill. For example, the engineers' of network operators work business hours, while the premises would be unoccupied by residential customers who work away from home. After the initial copper installation however, it is relatively unusual for the external network operator to need access the premises again unless there is a fault which does not happen very often. In the case of FTTP however, it is desirable to have access to the termination point and equipment for fault monitor, testing and diagnosis.

Optical terminations in the UK are currently similarly sited within the premises. The majority of FTTP customers in the UK are at the present commercial entities. Issues of accessibility of the ONT to the network operator, easy customisation and upgradeability, health and safety, and physical appearance discussed are still relevant, but are of less concern than would be the case for a residential customer. The commercial customer is more likely to have a bigger budget for their communications needs, so they also may have IT specialists to look after the equipment. With both the customer and the network operator working substantially the same business hours, appointment-keeping for testing and maintenance work on the ONT located within the premises, may be a less fraught affair. Also, a commercial entity is more likely to have a dedicated communications room where the equipment can be safely kept away out of harm's way. For a residential FTTP customer however, few of the above mitigating circumstances apply.

One solution to this problem is to provide the termination apparatus on the exterior of the premises. This is a known practice in the US. While this solution does allow the external network operator ready access to the ONT and the termination point, customer will either have all or no access to the fibre and electronic modules of the ONT. A known solution to this problem is to house ONTs in a casing which including panels in a "stable door" arrangement, where lockable panels shield parts of the ONT from the customer. Typically, the network operator can access all the components, while the customer cannot have access to those parts which are shielded from and locked against him. However, customers may still do damage to the network operator's components directly or indirectly, and a PCB (printed circuit board) is not a user-friendly interface for non-expert use. Furthermore, any customisation carried out by the customer would probably result in data and other cables which would have to find their way into the premises in possibly dangerous ways.

Moreover, this external location means that the equipment is vulnerable to damage—environmental, accidental and malicious. The ONT housing has to be made very heavy and strong to protect its contents—this has an impact on its cost and its size. While a covered-up drill hole on the house exterior in a copper installation is probably just about acceptable in a residential setting, a reinforced ONT housing large enough to contain all the equipment required for an optical installation is unlikely to be. The applicants are aware of at least one new-build housing development in the UK where the building specifications require that equipment from any utility service provider or otherwise be installed in a manner which would not be visible from the outside the premises. It would not be possible to deploy externally-mounted ONTs in such a housing development.

Another solution is to flush-mount the housing in the exterior wall. The housing could take the form of a utility box such as the type for gas and electricity meters. This is obviously a more expensive solution as the housing itself is more specialised; installing the housing also take more time and money and in retrofitting a premises, considerable damage to the building infrastructure. The applicants have also a co-pending application WO2005/096054 for a cavity-installed optical termination point, which addresses many of the problems concerning damage to the equipment and so on. However, this invention does not fully address issues concerning upgradeability and allowing a customer greater freedom in customising the CPE within the premises.

This is related to an ongoing issue in the UK raised by Ofcom in the drive for improved open access to networks and services. Customers will have greater choice over what they want and who their provider is to be, with the aim of greater competition between telecommunications service providers, and a more open field for developers of applications and capabilities. In other words, the customer need not be tied to the provider who supplies or supplied the access network equipment to the premises. There is now a call to clearly demarcate the extent of the network operator's control and responsibility, so that the customer can choose to deal with equipment beyond the demarcation as he sees fit. It is in the UK at this time not known where the demarcation will be drawn, although it is anticipated that this will extend up to and include the optical termination.

The problems described above have been addressed in different ways in the prior art, wherein some solutions are directed at particular aspects but not to others.

According to a first aspect of the invention, there is provided apparatus for connecting telecommunications equipment of premises to a telecommunications network, the apparatus comprising
a first module associated with the telecommunications equipment,
a second module associated with the telecommunications network,
the first module connectable to the second module by a telecommunications link, and
access means permitting access to only one of either the first module or the second module.

By using this apparatus, customer's premises can be connected to a public telecommunications network in a manner which permits the network operator to have access to the module comprising plant and equipment associated with the access network, but not to the module directly interfacing with CPE and the like which can be located within the premises (which the network operator cannot enter without the customer's authority). In one embodiment, the network operator module is located on the exterior of the premises to permit the network operator to gain access to its module from the exterior of the premises, and the customer module is located within the premises building. Preferably, the network operator's module permits the apparatus to optically communicate with the network. The link between the two modules can comprise a data bus. The two modules can be configured in a number of ways, from being located in physically separate housings, to comprising components separated only by being mounted on the two sides of a single circuit board.

According to a second aspect of the invention, there is provided a module for connecting telecommunications equipment of premises to a telecommunications network, the module comprising
a transmitter,
a receiver,
means to encapsulate and decapsulate traffic,
module configuration and operation control means, and
means to communicate with the telecommunications equipment.

This module allows the network operator to perform the core tasks associated with the transmission and receiving of telecommunications signals to and from the access network. Preferably, the module includes physical access means (e.g. a lockable door) which permits an agent of the network operator to access the module without giving access to the intermediate apparatus (which can therefore be controlled more closely by the customer).

Naturally, a protocol will be used for transmitting and receiving data over the access network which is suitable for whichever access network is employed. Such a protocol will generally include at least a data-link layer in which data presented to the protocol is encapsulated before it's transmission over the access network and decapsulated upon its reception from the access network. In general, encapsulation involves forming the data into some sort of packet or cell and adding a header portion which is useful only to the corresponding (e.g. data-link) function at the far end of the access network; this header is then stripped off by the receiving unit at the far end of the access network and the data is said to be decapsulated. For example, where the access network is a Passive Optical Network (PON) one of the well known protocols APON (A=ATM), BPON (B=Broadband), GPON (G=Gigabyte) or EPON (E=Ethernet) may be used. In each case the means to encapsulate and decapsulate data comprises the necessary means for encapsulating and decapsulating data for transmission, or having been received, over the access network according to the respective access network protocol employed.

Preferably, the module can be deployed as the network operator module at the premises (by the network operator) so that the customer is free to himself provide the customer module which would interface between the network operator module and the CPE sited within the premises.

According to a third aspect of the invention, there is provided an installation at premises for connecting telecommunications equipment of the premises to a telecommunications network, comprising
a first module associated with the telecommunications equipment,
a second module associated with of the telecommunications network,
the first module connected to the second module by a telecommunications link, and
access means permitting access to only one of either the first module or the second module.

In the installation connecting the premises to the access network, the network operator can have access to the network operator module but not to the module directly interfacing the CPE sited within the premises. In one embodiment, the customer module is sited within the premises, and the network operator module sited outside the premises (e.g. on the exterior of the premises building wall). In another, preferred embodiment, the premises includes a cavity wall defining the boundary of the premises, and the apparatus is adapted to be installed in the cavity of the premises wall.

According to a fourth aspect of the invention, there is provided a method of providing premises with a telecommunications interface connectable to a telecommunications network, comprising the steps of
installing at the premises a module being associated with the premises,
providing means for terminating at the module a cable of the telecommunications network;
providing means to effect a telecommunications link between the module and telecommunications equipment associated with the premises via intermediate apparatus, and
providing access means to permit access to the module from outside the premises.

By using this method, the network operator can make the customer premises ready for connection to the external telecommunications network in a manner which allows the customer to provide his own customer module for connection to the CPE within the premises. Furthermore the network operator can have access to the network operator module without having to enter the premises.

According to a fifth aspect of the invention, there is provided method of providing premises with a telecommunications interface connectable to a telecommunications network, comprising the steps of
installing at the premises a first module being associated with the premises,
installing at the premises a second module being associated with the telecommunications network,
providing means for terminating at the second module a cable of the telecommunications network;
providing means to effect a telecommunications link between the first module and second module; and
providing access means to permit access to the second module from outside the premises.

By using this method, the customer premises can be prepared for connection to the external telecommunications network in a manner which allows the network operator to have access to the network operator module without having to enter the premises. The network operator may provide both modules to the premises in an initial step, and the actual connection to the network in the form of a transmission to and from the premises may be effected only later.

According to a further aspect of the invention, there is provided a method of providing premises with a telecommunications interface connected to a telecommunications network, comprising the steps of
installing at the premises a first module being associated with the premises,
installing at the premises a second module being associated with the telecommunications networks,
terminating at the second module a cable of the telecommunications network;
providing a telecommunications link between the first module and second module; and
providing access means to permit access to the second module from outside the premises.

In this method, the customer premises have been connected to the external telecommunications network, allowing the network operator to have access to the network operator module without having to enter the premises.

Systems, methods and apparatus embodying the present invention will now be described by way of example only, with reference to the following drawings, wherein.

Figure 8A:
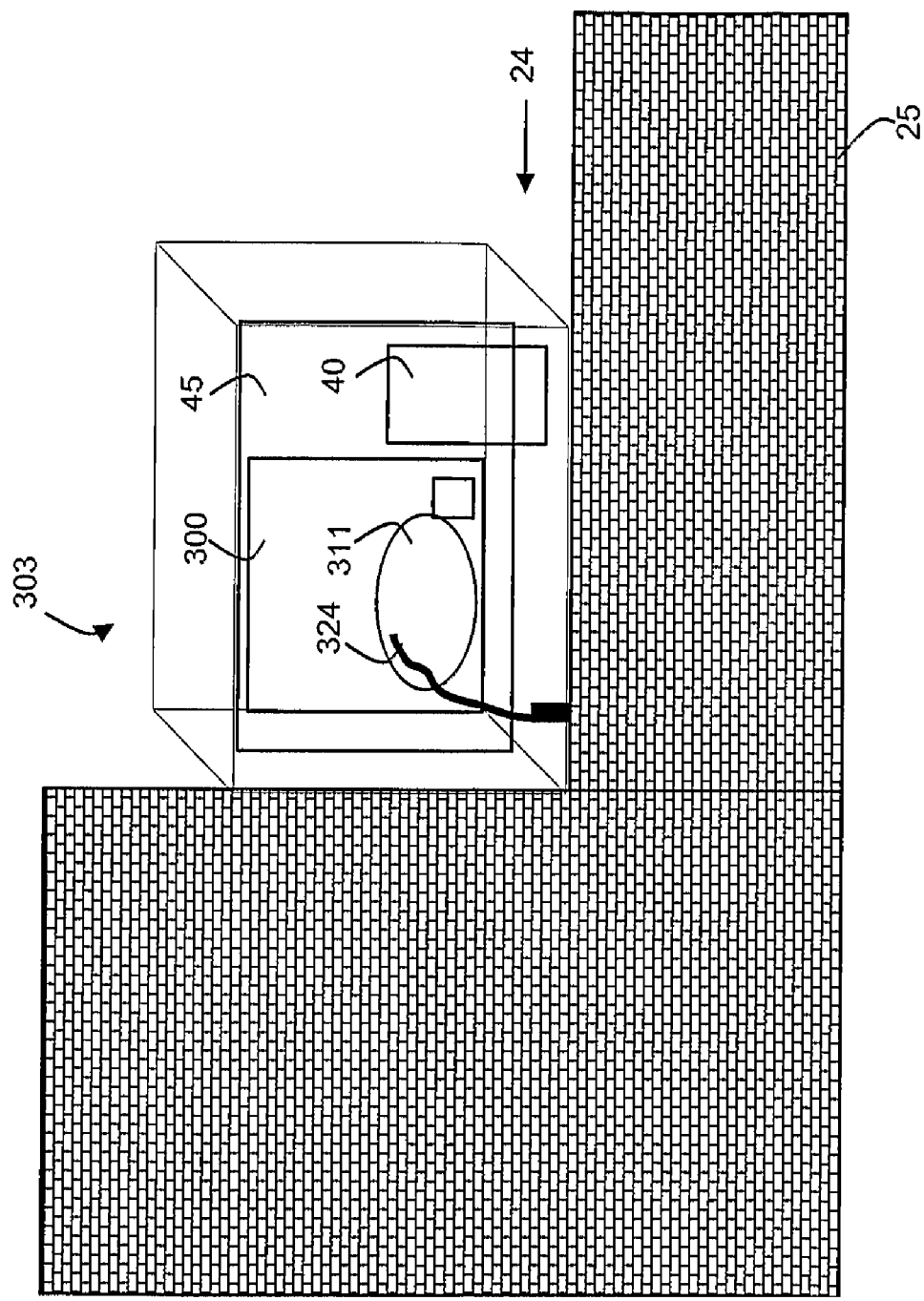
Figure 8B:
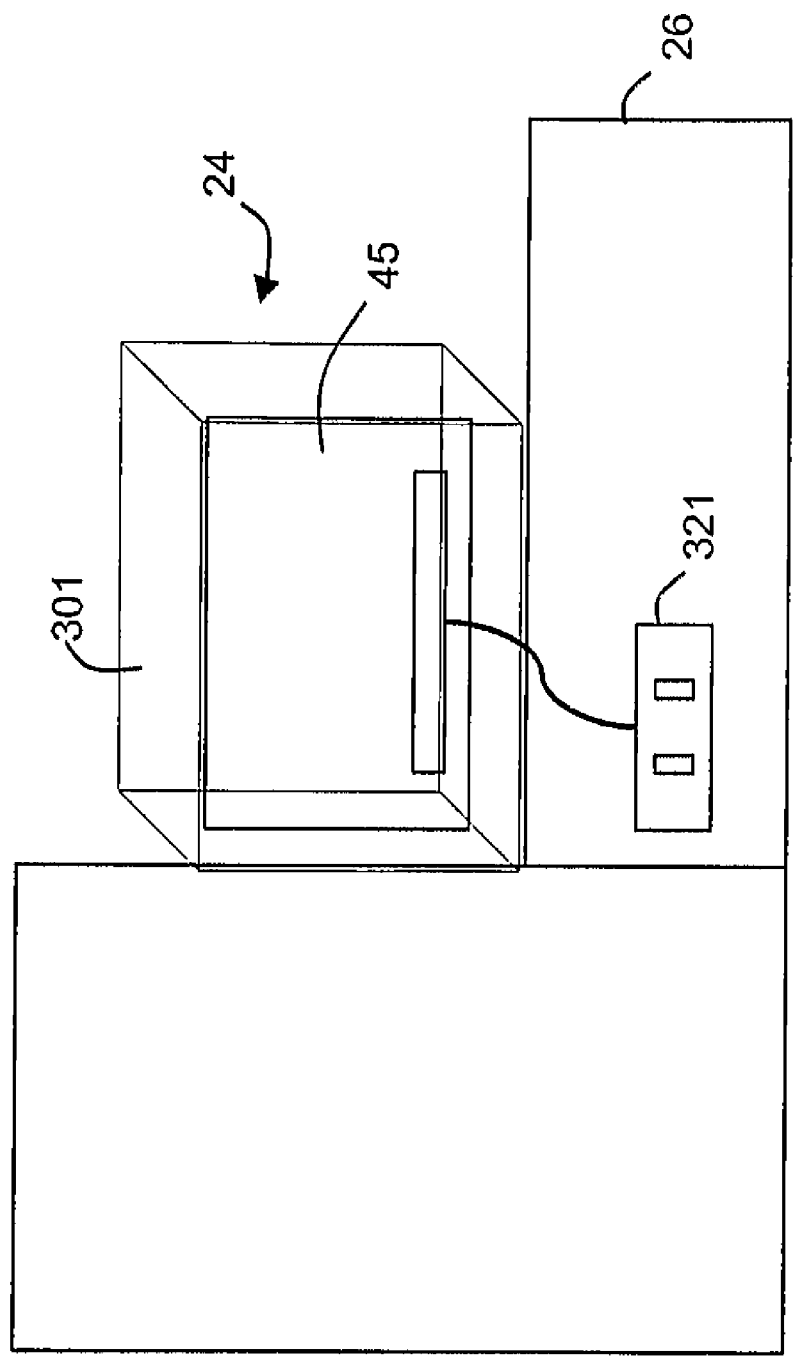

FIGS. 8A and 8B schematic views of the second embodiment of the invention from the outside and inside of the premises.

The method and apparatus of the present invention address the above problems and issues especially, but not exclusively, in the provision of FTTP to residential customers. In particular the invention seeks to address issues surrounding the demarcation point representing the end of the network operator responsibility.

Figure 1:
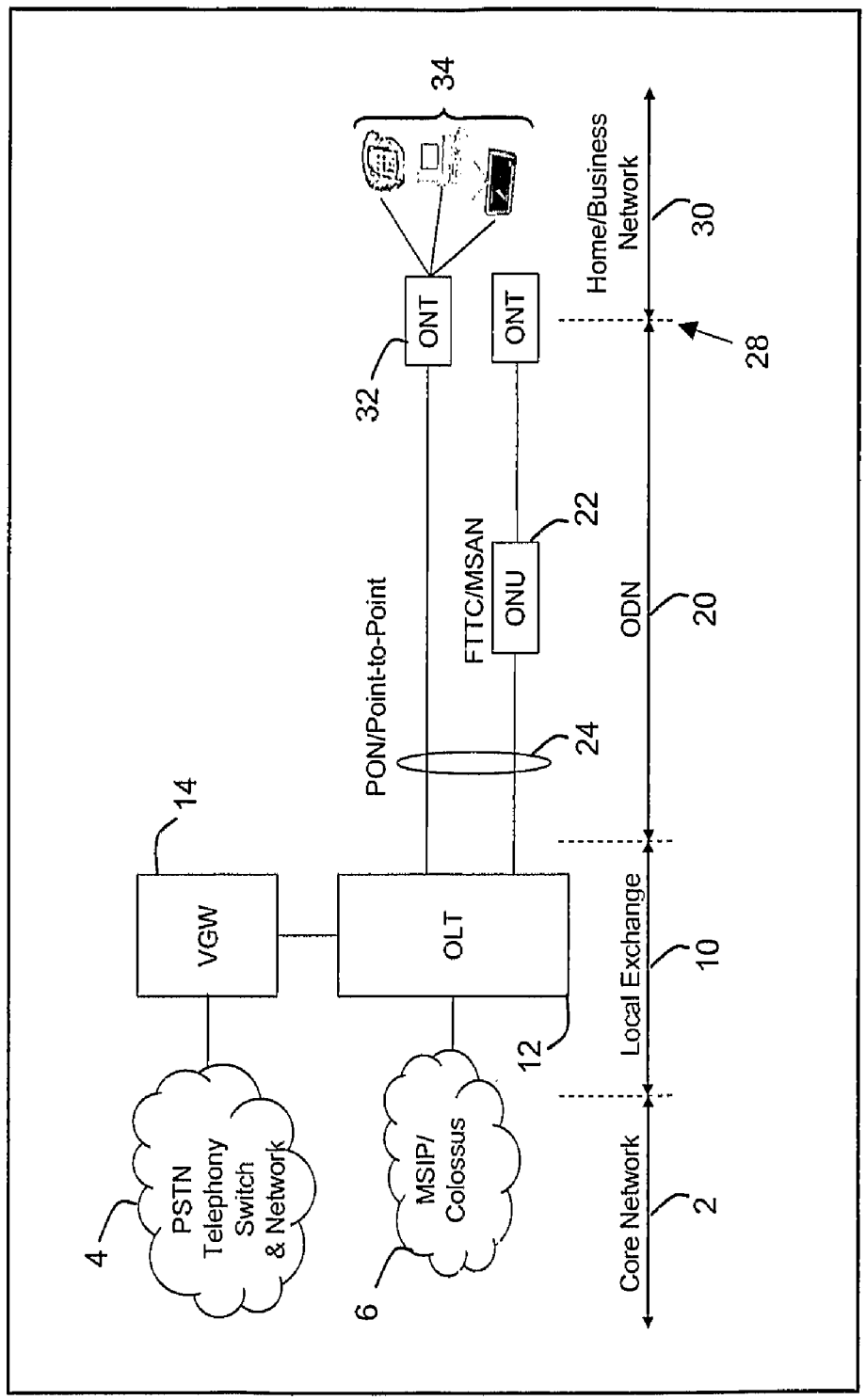
FIG. 1 is a schematic diagram of the access network and equipment leading to and from customer premises.

FIG. 1 is a schematic diagram depicting an overview of how, in the UK, the access network typically leads into the home/business network (30) within customer premises. The core network carries data over the PSTN (public switched telephone network) (4) and the networks based on IP (internet protocol) and/or ATM (asynchronous transfer mode) (6). At the local exchange level (10), voice gateways (14) and optical line terminations (OLTs) (12) connect to the ODN (20). The access network is the part of the PSTN which connects access nodes to customers, and typically comprises plant, transmission facilities, etc. which provide the required transport bearer capabilities for the provision of telecommunications services. An example of this is a GPON-based network (as described in ITU G984.1), and an ONT suitable for use with such a network is described below in connection with FIG. 2.

The ODN can comprise a passive optical network (PON) or a point-to-point connection (24). These lead to the customer premises, at which boundary (28) the network external to the premises is terminated at optical network termination (ONT) points (32). Customer premises equipment (CPE) (34) are connected to the external network via the interface provided at the ONT. CPE can be anything as simple as a single analogue PSTN telephone, to a complex home/business network including routers, switches, WiFi equipment, gateways, RF video and so on.

Here, "premises" refers to the physical building structure within which the CPE (34) is located (as opposed to e.g. the land on which the building sits). The boundary point (28) typically comprises a wall of the premises building, which defines the interior of the premises, and the exterior of the premises. The access network, which is sited mainly on public property, is thus terminated at the ONT at the boundary wall.

The ONT (32) is sited at and marks the boundary (28) between the external access network and the customer premises. As noted in the introduction above, this is traditionally the demarcation point indicating where the network operator legal responsibility for and control over the network ends.

Figure 2:
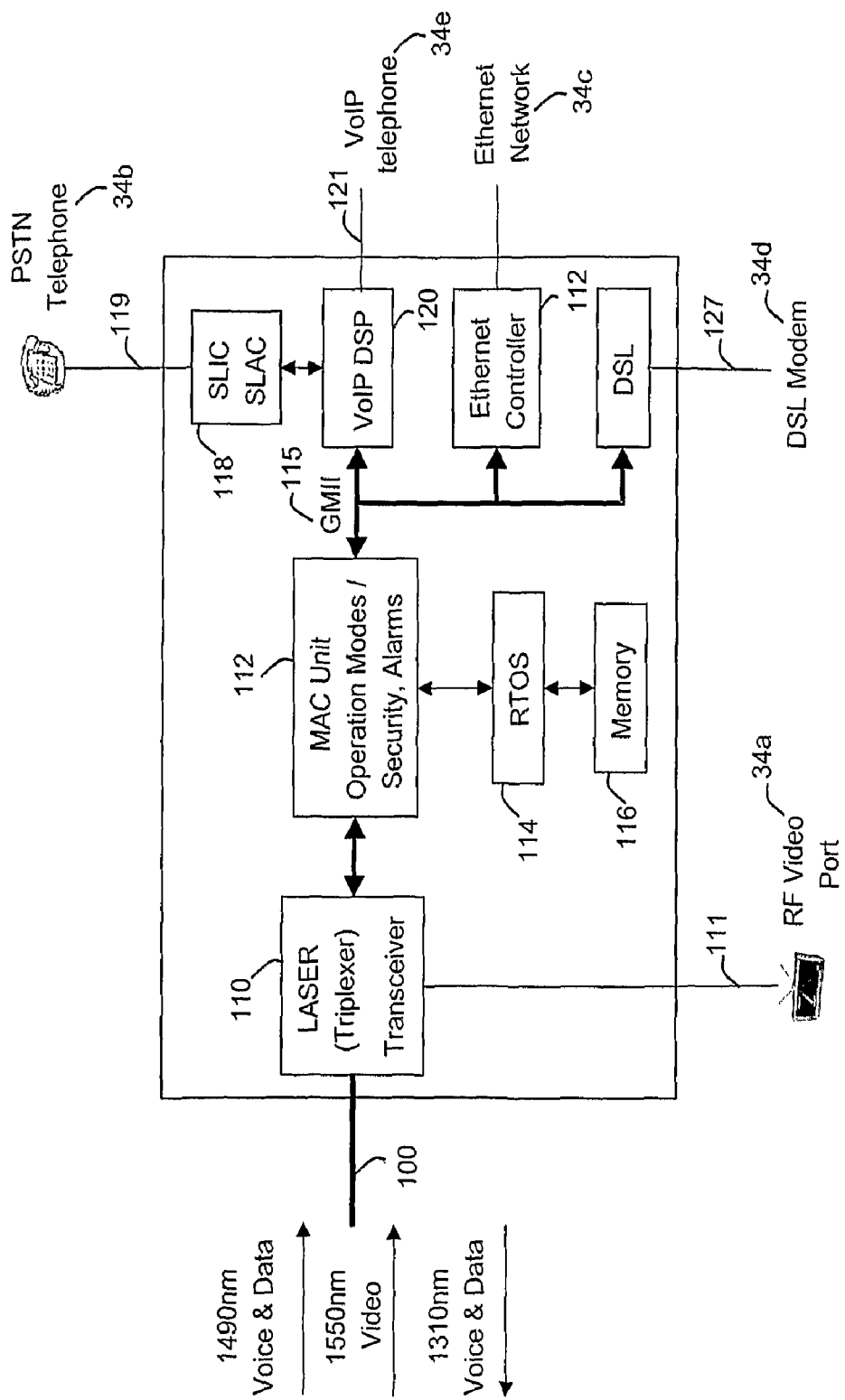
FIG. 2 is a block diagram of the typical components of a GPON (gigabit passive optical network) optical network termination (ONT)

Different ONTs exist for different systems: for example an ONT can be based on ATM, Ethernet, or point-to-point systems. The precise configuration of each are slightly different, but they all have in the main similar components working in a similar fashion. FIG. 2 is a block diagram showing the typical components of an ATM-derived ONT (32). In brief, the main components function as follows.

Downstream and upstream signals to and from the ONT can be transmitted on an optical fibre (100) on different wavelengths using wavelength division multiplexing (WDM) methods. Downstream voice and data traffic is transmitted over the fibre to and from the access network at the 1490 nm wavelength, and upstream at 1310 nm. The 1550 nm band can be used for video transmissions for cable television. The transceiver (110) can comprise a diplexer if only voice/data services are required. If a video overlay is to be included, a triplexer with an additional transmission path can be deployed instead—in this figure the triplexer (110) outputs data to the cable television port (34a) via an RF connection (111). Alternatively, the transceiver can comprise a filtered diplexer and video can be provided on a separate video ONT. This would be added to the network fibre via an optical coupler. It would be possible to provide a video ONT by a party other than the network operator.

The transceiver (110) passes traffic to and from the MAC (media access controller) unit (112), which removes headers from arriving packets and unencrypts the received data. It controls the ONT's set-up operation, data transfer and encryption modes, and synchronises its activity with the OLT. The ONT's alarm functionality, e.g. to raise an alert if and when there is equipment or fibre failure along the connection, is also controlled at the MAC unit.

The RTOS (real time operating system) (114) is the onboard microprocessor, which with the memory (116), runs the ONT and which communicates via the MAC unit, with the OLT to set parameters and configurations.

The ONT's internal data bus in this case is a GMII (gigabit media independent interface) (115), which communicates with the MAC unit (112) and the CPE (34) at gigabit clock-speeds. In non-GPON ONTs, the data backbone interface could comprise a UTOPIA (universal test and operations physical interface for ATM) bus. As is known in the art, a data bus comprises two parts: a data bus which transfers the data itself, and an address bus which transfers information about where the data should go.

Signals are passed via this interface to the voice and data processor, comprising VoIP (voice over internet protocol) and DSP (digital signal processor) modules (120). Typically, voice signals have priority over data signals, so voice packets are processed first. Voice signals can be sent via a VoIP port (121) to a digital telephone (34e). If IP or ATM signals are to be converted to an analogue signal for a PSTN telephone (34b), SLIC/SLAC (subscriber line interface and access controllers) modules (118) can be integrated within the ONT with a voice port (119), or provided separately as a plug-in adapter.

An Ethernet controller (122) for the customer Ethernet network (34c) could include built-in basic bridging, routing and other functions. A DSL (digital subscriber line) (124) component to transfer signals to a DSL modem (34d) via a data port (127) can be integrated in the ONT as shown in FIG. 2, or again it could be provided as a plug-in module.

Figure 3A:
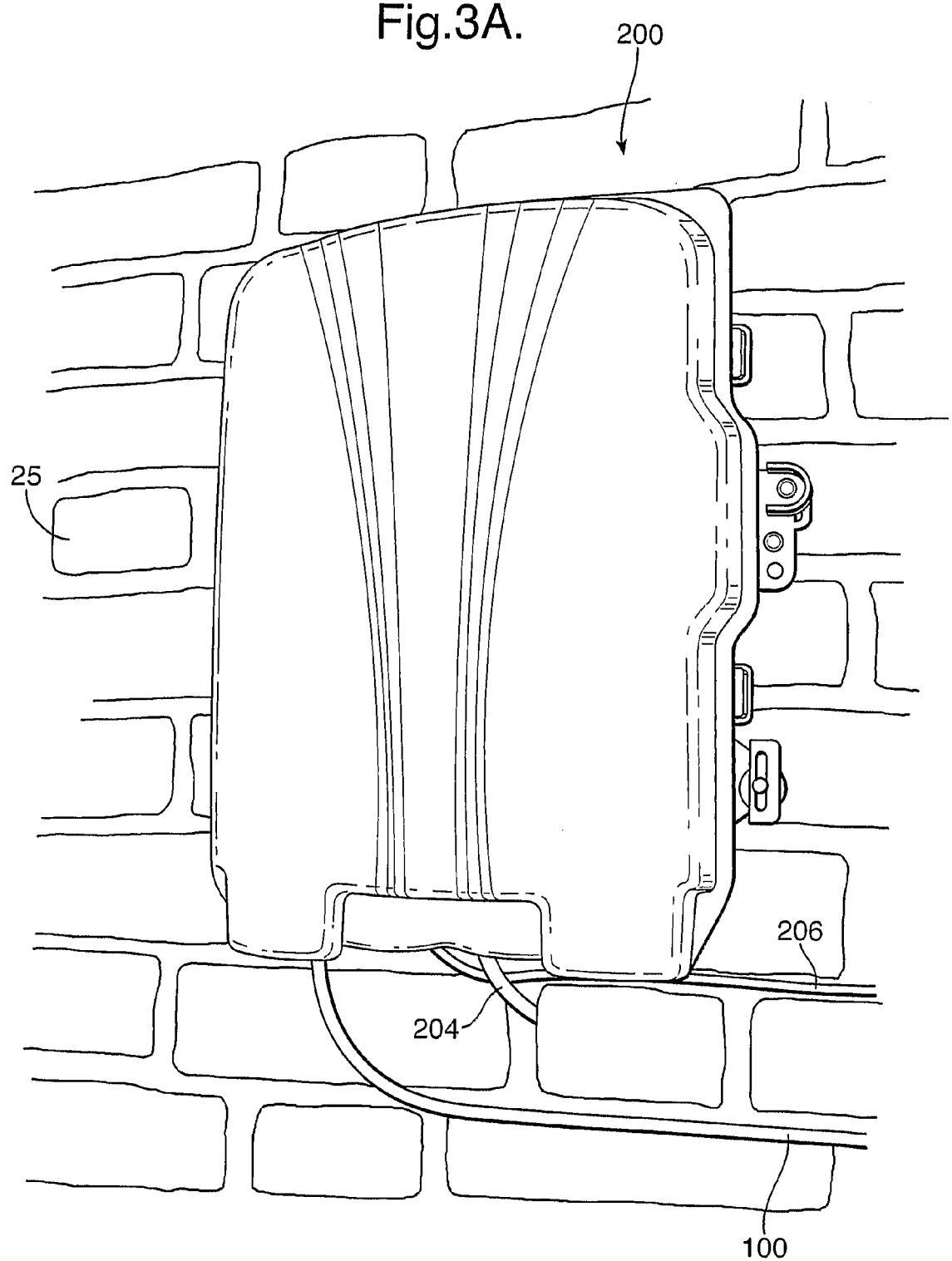
FIGS. 3A, 3B and 3C are views of an ONT of the prior art, for installation outside the premises.

FIG. 3A is a view of a housing (200) for an ONT of the prior art. This housing is used for ONT installations outside of the premises. Due to the fragility and cost of its contents, it is necessary to make it very strong to withstand environmental wear and tear, accidental damage, deliberate vandalism and security breaches. As can be seen, the housing is mounted on the exterior brick wall (25) of the premises, permitting the external network operator full access to the ONT contained within. The fibre cable (comprising one or more individual fibres) (100) in this installation is fed from a source outside the premises and is shown entering the ONT housing over the brickwork. A data cable (204) is shown extending from the housing into the premises through the premises wall. The other cable in this figure is the electricity cable (206) leading to and from the power source, which powers the ONT installation.

Figure 3B:
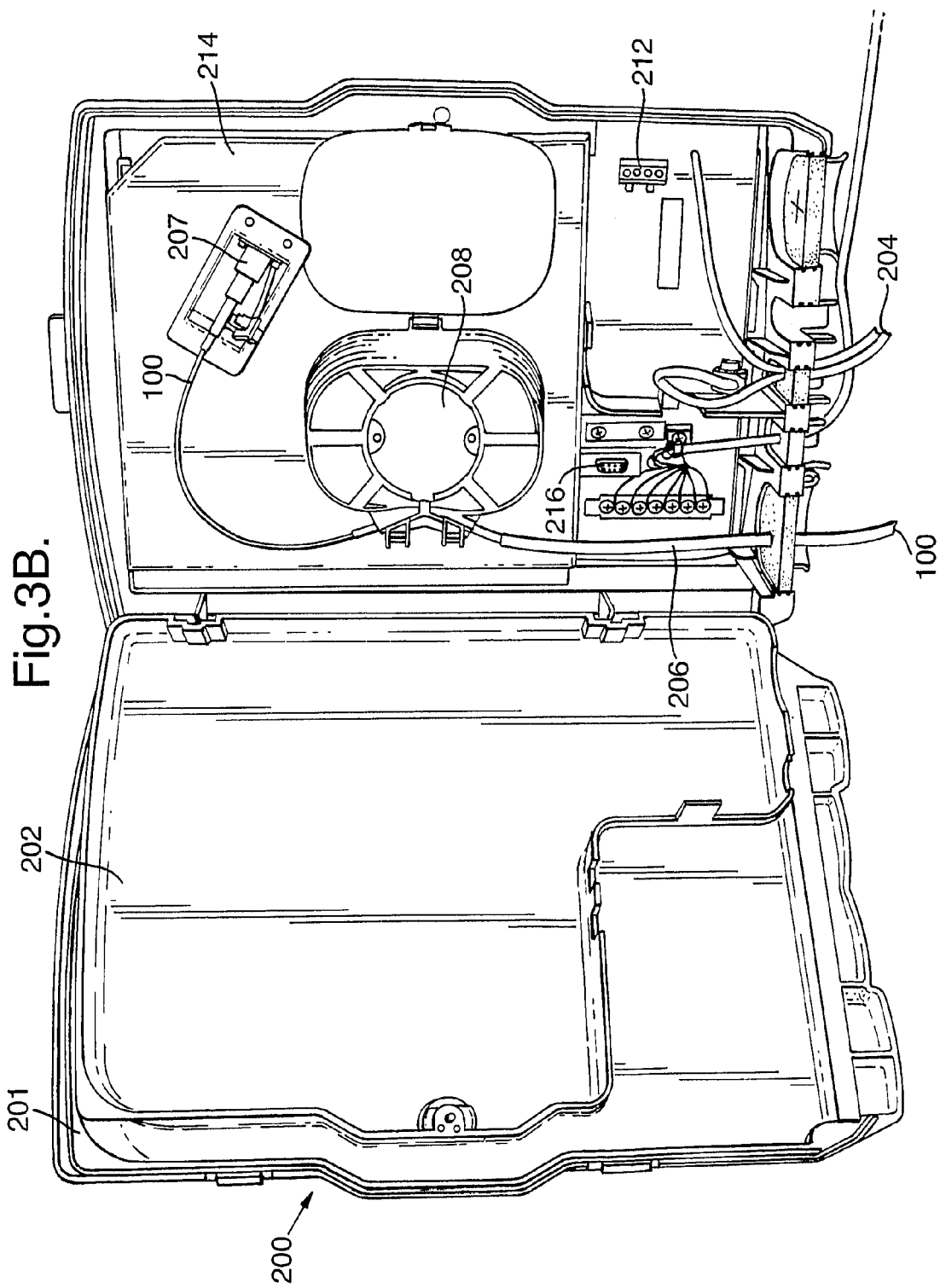

FIG. 3B shows the same ONT housing (200) with the front cover open showing components of the ONT. The housing comprises an external casing door (201) and an internal casing door (202). The two casing doors can be separately closed/locked. It can be seen from the shape of the internal casing door, that when the external casing door is open and the internal casing door is shut, only a certain section of the ONT components are accessible. The components available in this section of the ONT tend not to relate to the optical fibre.

The optical fibre in the cable (100) is broken out of its sheath, and one of them connected to the ONT using an optical connector (207). Other individual fibres are bend-managed and stored on a splice tray (208), which here is shown with its cover open. The splice tray is mounted on a metal cover (214). Also visible in this figure are the Ethernet data port and voice terminal block (212). The console port (216) provides a point of connection for an engineer of the network operator to test and carry out maintenance work on the ONT.

Figure 3C:
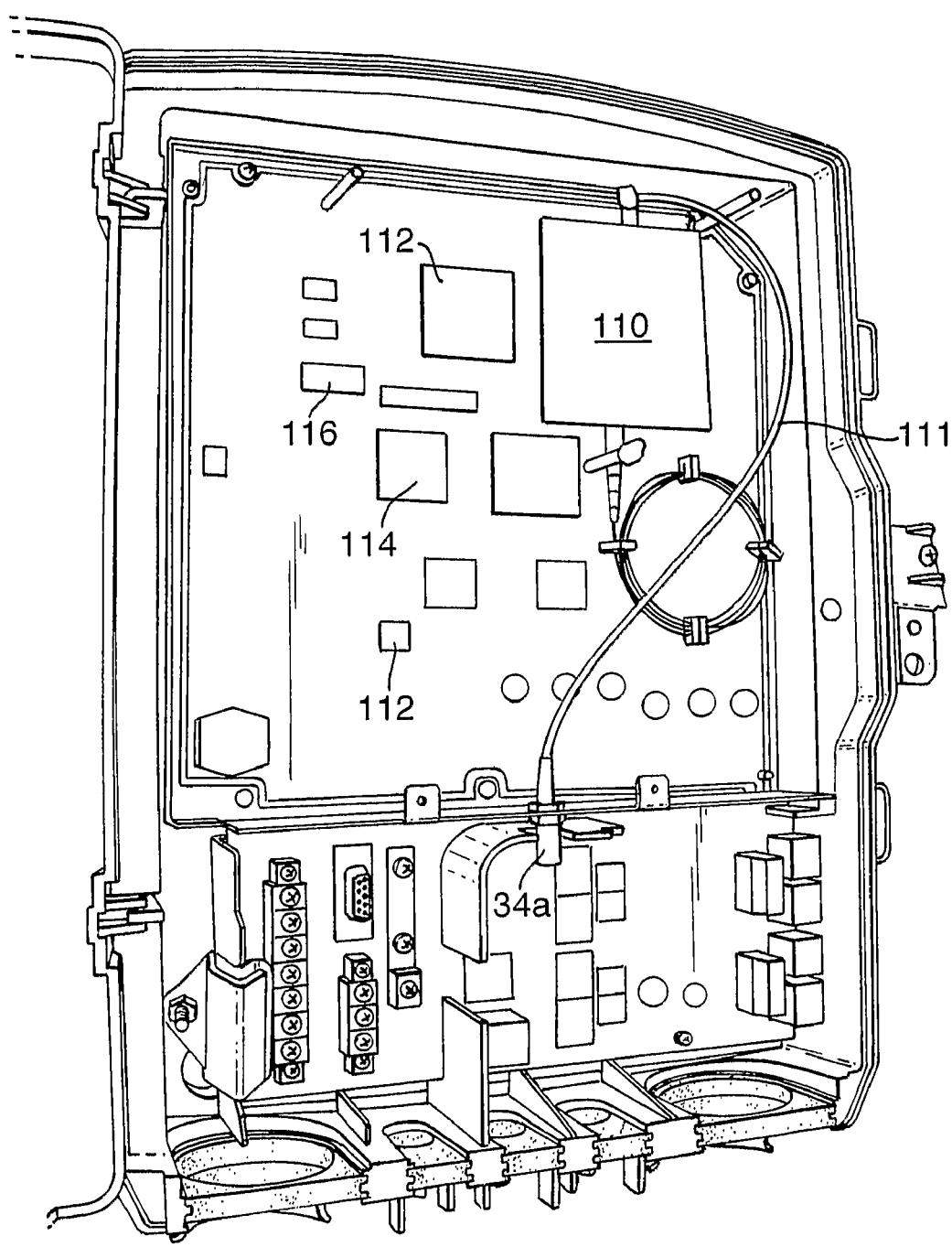

FIG. 3C is another view of the ONT of FIG. 3B. The metal cover (214) (upon which the splice tray was mounted in FIG. 3B) is removed in this FIG. 3C, as well as the fibre, data and power cables. The transceiver (110) (here, a triplexer), the MAC chip (112), and the RTOS (114) are in this figure covered by thermal tape to dissipate excess heat. The radio frequency (RF) cable (111) leads from the triplexer to the RF video port (34a). The other main components here are the memory chip (116) and the voice processing unit (120). The console port (121) allows an engineer of the network operator to connect and test other equipment to the ONT to carry out work thereat. The components of all ONTs are, with very little variation, arranged on the PCB in a manner similar to that shown in FIG. 3C.

Figure 4:
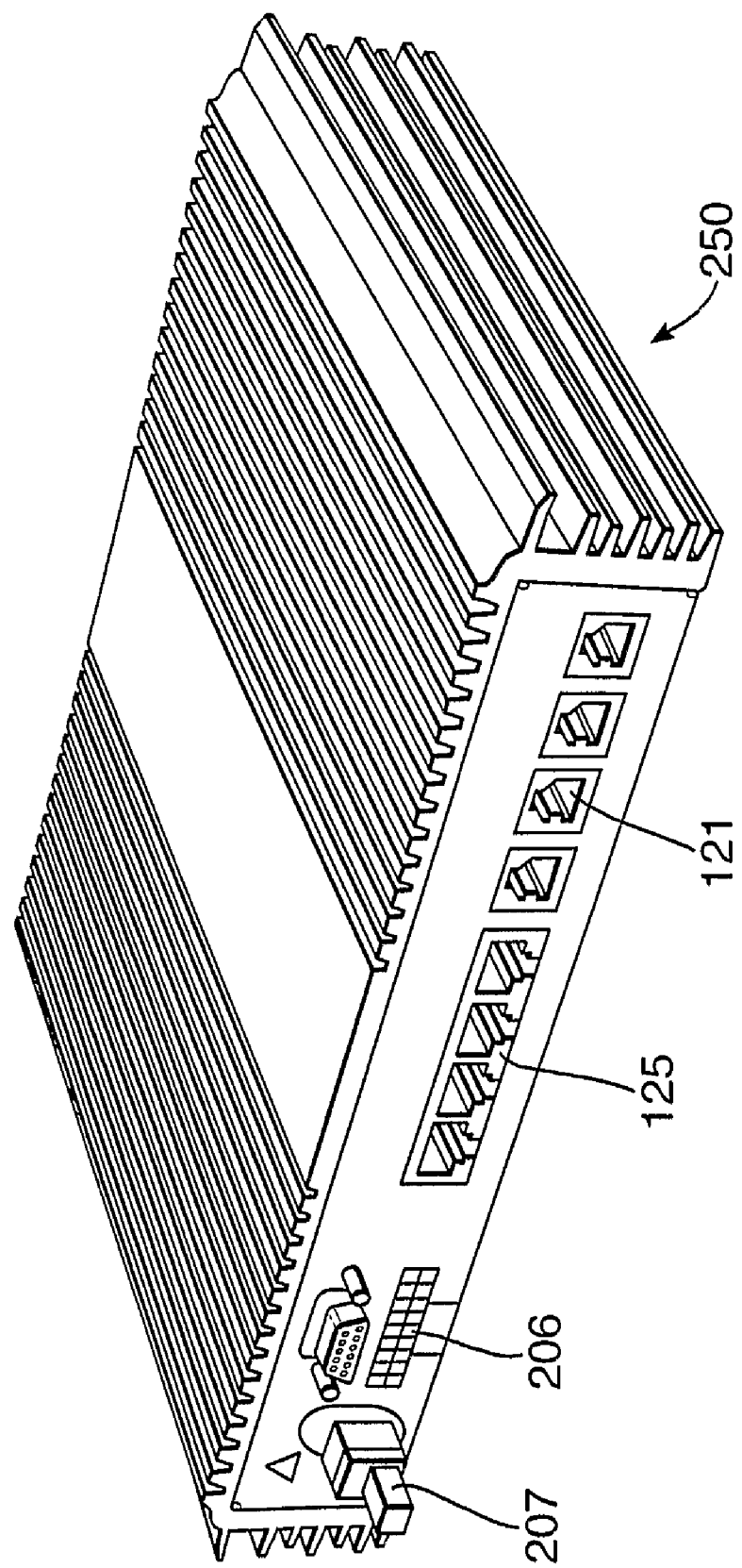
FIG. 4 is a view of an ONT of the prior art, for installation inside the premises.

In FIG. 4, which is a view of an ONT unit (250) for use within the premises, one immediate obvious difference is that the housing is considerably less robust. The four VoIP ports (121) and four data ports (125) are neither protected nor hidden away. Also visible is the power supply port (206), and the optical connector (207). The PCB within the unit (not shown) however, is laid out in a manner similar to the one shown in FIG. 3C.

FIRST EMBODIMENT OF THE INVENTION

Figure 5:
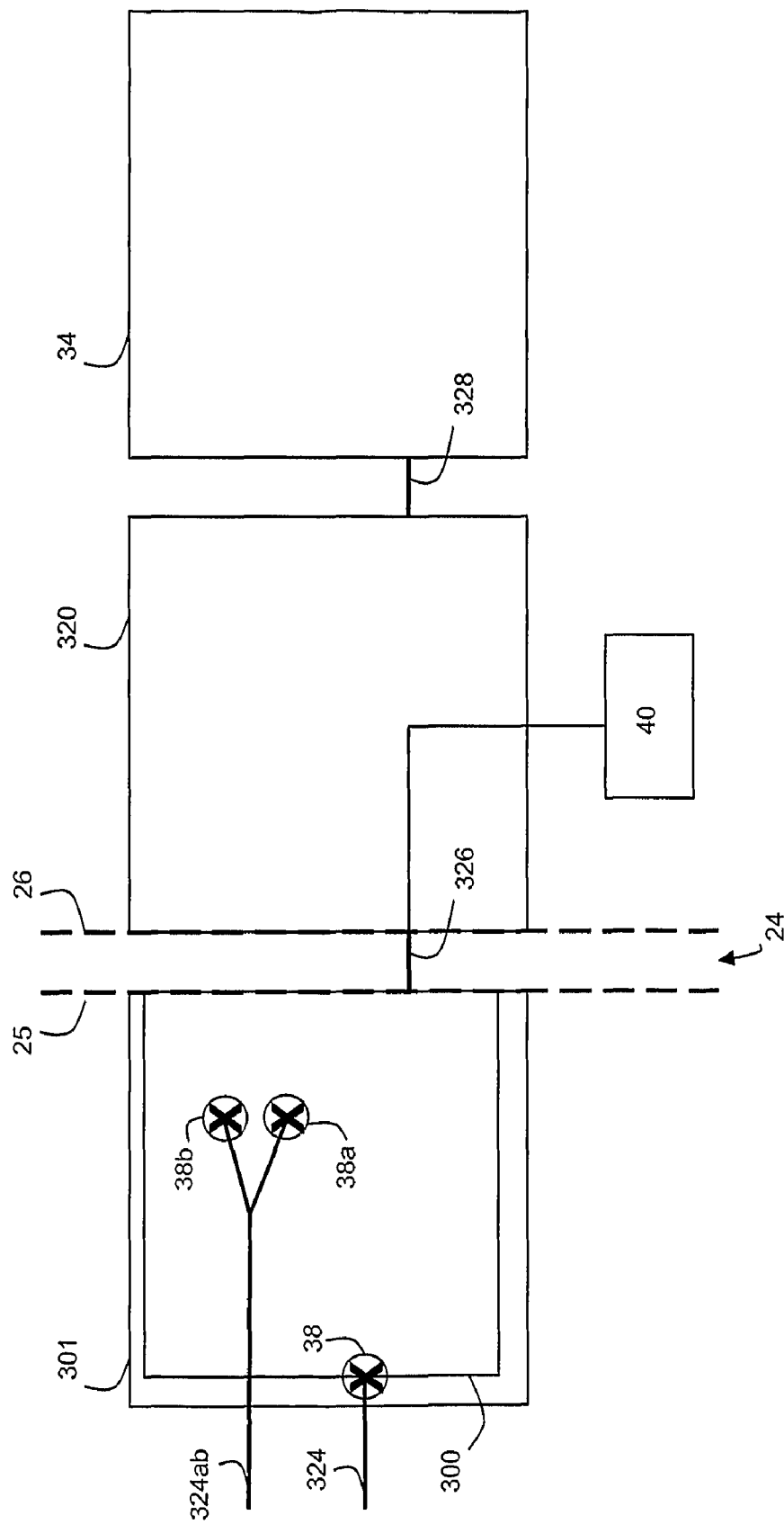
FIG. 5 is a block diagram of a first embodiment of the invention.

FIG. 5 is a block diagram of a first embodiment of an ONT according to the invention. The ONT comprises two modules (300 and 320) which are installed at or near the wall of the premises. This wall defines the boundary of the premises, and in the UK comprises two wall leaves: an exterior wall leaf (25) which faces the outside of the premises, and an internal wall leaf (26) which faces the inside of the premises. Between the two wall leaves is a wall cavity (24).

The first module (300) can be installed on the exterior wall leaf facing the outside of the premises, or anywhere outside the premises. It includes components controlling those ONT functions related to the external network, and is protected in a housing (301) e.g. by the kind of housing described against FIG. 3A above (200). This module is accessed and controlled by the network operator, and shall be referred to as the "network operator module". The housing is lockable so that only the network operators (and authorised persons) can have access to its contents.

The second module (320) can be installed on the interior wall leaf (or anywhere within the premises), and faces the inside of the premises. It includes components which determine the type and manner of operation of CPEs (34) within the premises. This module is accessed and controlled by the customer and as it is not as exposed to the elements, does not require a strong housing. This module shall be referred to as the "customer module". As the module is sited within the customer's premises, only the customer (and authorised persons) can gain access to it.

The two modules (300 and 320) are connected by a transmission link (326), which in the invention carries signals over a relatively short-range distance, and which can comprise a multicore electrical cable. This cable carries a low voltage, direct current from a power unit (40) to the first module (300) for processing in one direction, and in the opposite direction, data signals between the first module and the second module (320) along the GMII backbone (115 in FIG. 2). In one embodiment, the transmission cable link can be an Ethernet cable, which passes through the wall leaves (25 and 26) and the wall cavity (24).

As noted above, the GMII backbone (in a GPON embodiment of the invention) is an internal bus interface between components, as in known the art. Here, the link (326) connects the first and second modules and allows for transmissions therebetween.

The skilled person would of course appreciate that the power and the data signals can be carried on two separate cables. The skilled person would also realise that signals can be transmitted along media other than an electrical cable and that the signals need not be electrical in nature. For example, the transmission link could itself comprise an optical fibre. Although this would not solve the problem of isolating the customer from optical fibre, this embodiment carries with it the other advantages realised by this invention. As discussed above, the transmission link is a physical link, although it could also be a wireless link carrying signals e.g. according to the IEEE 802.11x specification.

FIG. 5 also depicts how the fibre (324) of the external network is terminated in the network operator's module (300). As noted above, prior art ONTs presently terminate the fibre (324) of the external network by plugging an optical connector (207 in FIG. 3B) coupled to the end of the fibre, into a socket of the transceiver. Where the transceiver comes provided with a length of optical fibre called a fibre tail, the connector plug can, in a preferred embodiment of the invention, be replaced by a splice of the fibre directly to the fibre tail of the transceiver, which will have the advantage of lower optical losses during operation, and increased reliability.

In the embodiment shown in FIG. 5, the termination point is shown to be at (or near) the end of the housing (301) closest to reach by an engineer. This is however only for convenience, and the actual termination point can be anywhere within the housing (301). For illustration, another location is depicted for the termination of a fibre (324ab) at a termination point (38a). The single fibre (324ab) could carry a number of different data signal types, e.g. voice/data and video, and more than one termination point (324a and 324b) could be included in the network operator's module (300) to process these signals.

Wherever the exact location of the actual termination point within the network operator module, the invention envisages that there will be no fibre nor equipment belonging to the network operator within the customer premises. The customer module is thus outside the control and responsibility of the network operator. It is currently anticipated that the transmission link (326) will remain with the control and responsibility of the network operator, but the skilled person would however realise that it would be possible to re-designate the ownership and control of the transmission link from one party to the other, where such components do not have a direct bearing on the whether they control functions related to the external network, or to CPEs (34) within the premises.

The network operator module (320) includes, at the minimum, the following optical and electronic functionalities:
 an optical terminal to receive and terminate the fibre from the external network,
 a transceiver to receive and send signals to and from the external network, typically in the form of a diplexer or a triplexer, and
 a MAC unit to strip incoming packets of header information, and to enable the ONT to communicate with the CPE.

It is envisaged that the network operator module (300) would also typically include the following further functionalities:
 alarm function to raise an alert in the event of transmission, equipment, fibre or other malfunction; and
 security function to raise an alert in the event of access to the module by unauthorised parties.

Further functionalities could be included in an enhanced module, such as:
 extended alarm functionality e.g. including loopbacks from the CPE ports and drive currents from the transceiver; and
 extended security functionality e.g. to monitor both physical and protocol/service levels.

The power required by the network operator module is shown here in FIG. 5 as a unit (40) hardwired into the mains supply of the premises. As noted above, power is transmitted to the ONT via the transmission link. A battery back up is also required to ensure that basic "lifeline" voice services are available: the battery can be positioned so that it is accessible to either the network operator and/or the customer. This would allow the network operator to monitor the power and battery status, and raise an alarm in the event of problems with the battery, or the ONT.

A significant aspect of the invention is that by separating the functionalities of the ONT in this manner, the network operator need not have access to the premises to work on the equipment which it owns and is legally responsible for. The security and transport protocol aspects of the ONT which belong too, and are core to the network operator, never leave the operator's control. For example, with static addressing of the ONT, test and diagnostics capabilities and so on, a "day one" profile can be established of external network performance. This is valuable information to the operator, allowing information about losses and characteristics to be gathered either intermittently or continuously, and performance of the connection, equipment and fibre can be monitored over time. It is significant for troubleshooting and diagnostic purposes, to know that only (professional) network operator engineers have dealt with the fibre and equipment of the network operator module.

Turning now to the customer module (320), this in the most basic form includes an interface to permit signals from the network operator module (300) to be transmitted to and from the CPE (34). It is expected that the CPE interface will typically comprise ports, sockets and such interfacing means for e.g. voice, Ethernet and RF data. In an enhanced embodiment, plug-in components could be included which can be as simple or complex as the customer wishes, such as for firewalls or routing functions.

As the interface between the network operator's module and the CPE, the customer module would not in the usual case directly communicate with the access network.

The link (328) in FIG. 5 depicts the plugged link between a CPE (34) and the CPE interfaces of the customer module (320). The CPE will then be connected—or connectable, if e.g. the fibre of the external network has yet to be installed by blown fibre methods—to the external network. As noted earlier, CPE (34) comprise analogue devices (e.g. PSTN telephones) or digital equipment (e.g. home hubs and routers), so the interfaces in the customer module (320) can be provisioned according to the customer's needs within the premises.

Figure 6:
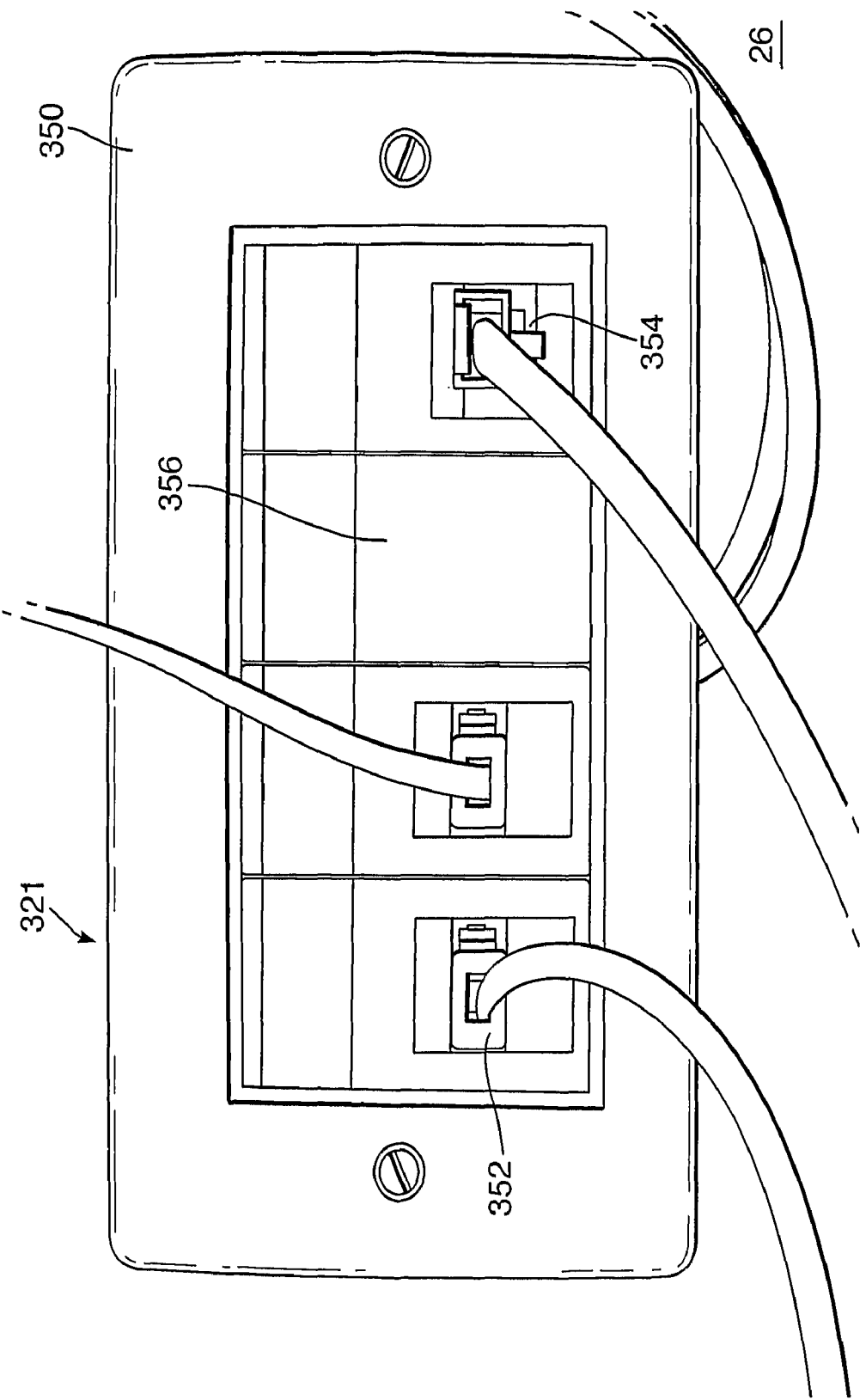
FIG. 6 is a view of a media access point.

The customer module can take the form of a MAP (media access point) within the premises. FIG. 6 is a view of an installed MAP (321) as it may appear to the customer. The back box and face plate (350) has the same visible dimensions as a standard 13 amp electrical socket, and is mounted on the internal wall leaf (26) of the premises. On the back of the face plate (not visible) are the components making up the customer module, as discussed above against FIG. 5. On the front of the MAP shown are two analogue telephone sockets (352) and an Ethernet data port (354). Another connection point— e.g. a coaxial plug for RF signals—can be added to this MAP, by substituting the blank face plate cover (356).

The customer module is thus both adaptable and easy to use. In its MAP embodiment, a customer can unscrew the face plate from the wall and add or remove to the components therein. This is a relatively easy task, and certainly one that can be performed by a moderately skilled amateur, certainly by an electrician. Once the desired component change has been made to the customer module, the MAP face plate can be re-mounted on the wall where it presents a non-disruptive, neat and safe interface for the customer's CPE.

The modular design of the ONT means that there is no need to replace the entire ONT (as would have been the case for prior art ONTs) when technology upgrades become available, Importantly, the customer is not exposed to any fibre of the external network in making upgrades or changes to the customer module, so is protected from the likes of laser hazard.

This aspect of the invention also has the advantage of clearly marking the extent of the network operator's responsibility. There is no ambiguity as to ownership of components, and the customer is not tied to the external network operator when CPE upgrades or customisation are required. Indeed, it is within the scope of the invention for the network operator to supply to the premises only those components making up the operator's module: this permits the customer to obtain the components of the customer module himself, or else obtain them from a competing service provider. The expectation for the immediate future however, is that the network operator will provide both modules to the premises, where the customer module will comprise at least an interface for a PSTN telephone (which is the service level provided at the current time in the UK for a copper installation).

SECOND EMBODIMENT OF THE INVENTION

Figure 7:
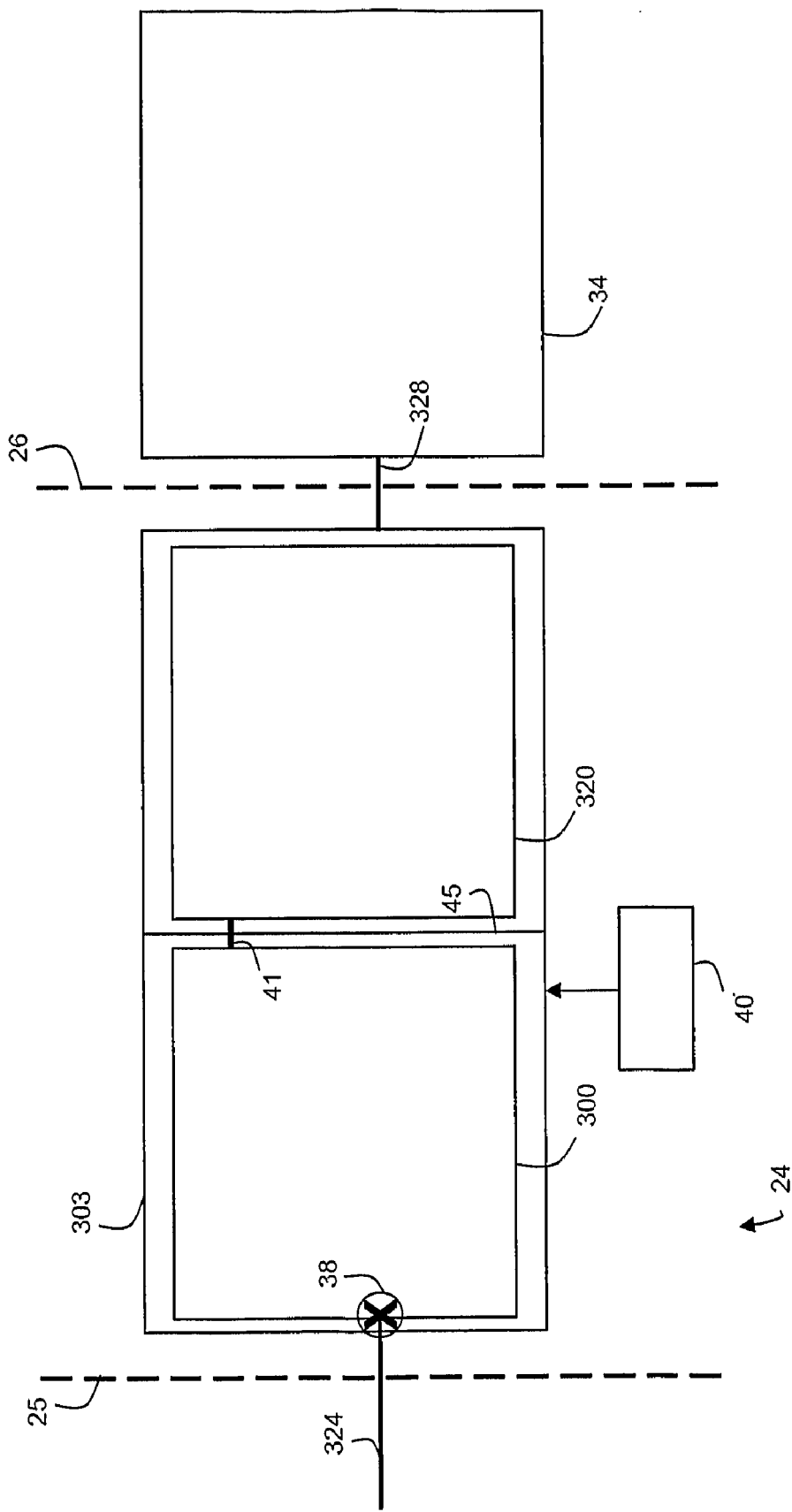
FIG. 7 is a block diagram of a second embodiment of the invention.

FIG. 7 is a block diagram of an embodiment of a second ONT according to the invention. This ONT is again sited at the premises boundary, except that the ONT components are now sited within the wall cavity (24). A housing (303) is installed substantially within the external wall leaf (25) and the internal wall leaf (26) defining the wall cavity (24) of the premises.

Most of the components of the respective modules and the functions of the ONT parts (with the same reference numbers) are identical or closely-similar to those described above in connection with the first embodiment of the invention, save for its arrangement. The housing (303) for this embodiment is constructed specifically for installation in the cavity of premises walls. This could take the form of the "brick replacement" described in the applicant's co-pending application published under no. WO2005/096054. In that application, a housing is described to accommodate an optical network termination point and associated apparatus. The present invention further provides for the segregation of ONT components according to the control and access required by each party so that the network operator retains control over the functionalities related to the external network, while the customer is allowed exclusive access to functionalities related to the CPEs (34) within the premises. The resulting separate modules can be accommodated in the "brick replacement" housing.

The structure of the housing can include a back plane (45) which substantially divides the housing into two sections— one facing towards the exterior of the premises, and the other facing the interior of the premises. A transmission link (41) connects the two modules through the back plane. A fibre (324) of the external network is terminated at a termination point (38). Only one termination method is illustrated here (where fibre 324 is terminated at 38), but the alternative methods described against FIG. 5 above are equally applicable in this embodiment. Specifically, the actual location of the termination need not be exactly on the backplane; it may be elsewhere as long as it is within the network operator's module (300).

The back plane (45) is significant in the working of this invention as it serves as a physical barrier preventing the network operator from accessing the customer's module, and the customers from accessing the network operator's module. It can consist of any method to achieve this end. For example, where the components making up the network operator's and customer's modules can be accommodated on the two sides of a single circuit board, the back plane could consist of the circuit board itself. This could be a pared-down, inexpensive solution. At the other extreme, the two modules could be housed in two completely separate cases which sit physically removed from each other (as in the first embodiment described against FIG. 5 above), but within the wall cavity (24). The skilled person will be able to identify alternative methods of segregating the functionalities within the scope and spirit of the invention.

In the typical case however, it is anticipated by the applicants that the modules will, as depicted in FIGS. 7, 8A and 8B below, comprise two PCBs, one for each module, in a single housing (303) including a back plane which will be part of the structure of the housing, and a transmission link to connect the two modules.

The housing can extend away from the wall cavity, but most of the module components will be contained within the wall cavity. This has the significant advantage of hiding away much of the bulk and clutter of the ONT equipment: in addition to considerably improved aesthetics, the network operator module comprising expensive and fragile components are better protected from the elements than would be the case in an external installation in a housing (301 of FIG. 5). Recessing the ONT in this way also shields the modules from accidental or deliberate harm.

Turning back to FIG. 7, the power supply (40) is shown to be fed from within the cavity to the modules. This power source can be, as in the first embodiment, connected to the mains supply within the premises.

FIGS. 8A and 8B are block diagrams of the second embodiment of the invention from outside and inside the premises respectively. In FIG. 8A, the housing (303) is shown recessed into the cavity (24). Visible from this view is the network operator module (300). The back plane (45) divides the housing (301) so that the customer's module behind the back plane is hidden from view—and importantly, from access by party accessing the network operator module. A fibre of the external network (324) leads in to the network operator module and is spliced on the splice tray (311) and then terminated.

In FIG. 8B, the view is of the customer's module (320) which is electrically connected by a cable to a MAP (321), which sits on the internal wall leaf (26). As noted above, most but not necessarily all of the housing (303) is recessed into the cavity as exemplified by the MAP which presents to the customer a familiar, user-friendly interface for the CPE.

In the module of FIG. 8B, the network operator module (300) is hidden from view behind the back plane (45). The two modules are connected by an electrical transmission cable (41, not shown in this figure). Alternatively, the interface could take the form of a module comprising a casing with interconnects capable to fitting to the back plane at one end, and a face plate on the opposite face which could comprise a MAP. This would "bring out" the ONT connection points out to the customer in the interior of the premises.

As noted above, there are significant advantages to providing an ONT solution which is recessed into the premises wall cavity, and this would be a preferred embodiment, particularly in new-build scenarios, as the housing (303) can be incorporated into the cavity—e.g. as a "brick replacement" as described in WO2005/096054—as the premises are being built.

However, the non-cavity solution described as the first embodiment of the invention against FIG. 5 can realise the advantages of the invention equally where cavity installation is not possible, or not convenient. For example, the premises may comprise solid (non-cavity) walls. In premises which are already existing when FTTP is rolled out, it may be unfeasible to retrofit a housing like a "brick replacement". In such cases, a conduit can be installed to pass the transmission link (326) to connect the modules sited on opposite sides of the premises wall, or else a hole drilled through the wall fabric for this purpose.

The apparatus, methods and configurations described above and in the drawings are for ease of description only and not meant to restrict the invention to any particular embodiments. It will be apparent to the skilled person that various sequences and permutations on the apparatus and methods described are possible within the scope of this invention as disclosed; similarly the invention could be used in various similar scenarios and building types.

The invention claimed is:

1. Apparatus for connecting telecommunications equipment located inside a premises, to a telecommunications network outside the premises, the apparatus comprising:
   a first module associated with the telecommunications equipment configured to be accessible from inside the premises; and
   a second module associated with the telecommunications network configured to be accessible from outside the premises and including means to terminate an optical cable of the telecommunications network and a transceiver;
   wherein in use the first module is separated from the second module by a dividing structure and is connectable to the second module by a telecommunications link through the dividing structure.

2. Apparatus according to claim 1, wherein the telecommunications link comprises a data bus.

3. Apparatus according to claim 1, wherein the dividing structure comprises a back plane within the apparatus, and wherein the apparatus is configured for location within a cavity of a wall of the premises.

4. Apparatus according to claim 3, wherein the back plane comprises a circuit board having a first side on which the first module is mounted, and a second side on which the second module is mounted.

5. Apparatus according to claim 1, wherein the premises includes a cavity wall defining a boundary of the premises, the cavity wall comprising an internal wall, an external wall and a cavity between the internal wall and the external wall, and wherein a housing is adapted to be installed in the cavity.

6. Apparatus according to claim 1, wherein the first module is connectable to the second module by at least one of a physical or a wireless link.

7. Apparatus according to claim 1, wherein the second module comprises:
   a transmitter;
   a receiver;
   means to encapsulate and decapsulate traffic;
   module configuration and operation control means; and
   means to communicate with the telecommunications equipment.

8. Apparatus according to claim 7 further including:
   module operation error detection means;
   module operation error diagnostic means;
   module operation error testing means; and
   security means to substantially prevent unauthorized access to the module.

9. An installation at premises for connecting telecommunications equipment of the premises inside the premises to a telecommunications network outside the premises, comprising:
- a first module associated with the telecommunications equipment accessible from inside the premises;
- a second module associated with the telecommunications network accessible from outside the premises and including means to terminate an optical cable of the telecommunications network and a transceiver;
- wherein the first module is separated from the second module by a dividing structure, and is connected to the second module by a telecommunications link through the dividing structure.

10. An installation according to claim 9, wherein the first module is housed in a first housing, and the second module is housed in a second housing, the first housing being installed inside the premises, and the second housing being installed outside the premises, and wherein the installation comprises a closeable access aperture in the second housing permitting access to only the second module from the exterior of the premises.

11. An installation according to claim 9, wherein the premises includes a cavity wall comprising an internal wall, an external wall and a cavity between the internal wall and the external wall, the installation further including a housing to house the first module and the second module, the housing being installed in the cavity, and wherein the access means comprises a closeable access aperture in the housing permitting access to only the second module.

12. A method of providing premises with a telecommunications interface connectable to a telecommunications network outside the premises, comprising:
- providing a first module being associated with telecommunications equipment inside the premises, the first module being configured to be accessible from inside the premises;
- providing a second module associated with a telecommunications network outside the premises, the second module configured to be accessible from outside the premises and including means to terminate an optical cable of the telecommunications network and a transceiver;
- providing means for terminating a cable of the telecommunications network at the second module; and providing means to effect a telecommunications link between the first module and the second module through a dividing structure separating the first module and the second module.

13. Apparatus according to claim 1, wherein the dividing structure comprises a premises wall, and wherein the first module is configured for location within the premises and the second module is configured for location outside the premises.

14. Apparatus according to claim 4, wherein the first module is mountable on the premises wall facing the inside of the premises, and the second module is mountable on the premises wall facing the outside of the premises.

15. Apparatus according to claim 1, further including at least one closeable access aperture for access to at least one of the first module or the second module.

16. Apparatus according to claim 1, wherein the second module comprises means for transmitting and receiving optical signals to and from the telecommunications network.

17. Apparatus for connecting telecommunications equipment located inside a premises, to a telecommunications network outside the premises, the apparatus comprising:
- a first module associated with the telecommunications equipment configured to be accessible from inside the premises; and
- a second module associated with the telecommunications network configured to accessible from outside the premises;
- wherein in use the first module is separated from the second module by a dividing structure, the dividing structure comprising a back plane within the apparatus, and the first module is connectable to the second module by a telecommunications link through the dividing structure, and wherein the apparatus is configured for location within a cavity of a wall of the premises.

18. Apparatus according to claim 17, wherein the back plane comprises a circuit board having a first side on which the first module is mounted, and a second side on which the second module is mounted.

19. Apparatus according to claim 18, wherein the first module is mountable on the premises wall facing the inside of the premises, and the second module is mountable on the premises wall facing the outside of the premises.

20. Apparatus for connecting telecommunications equipment located inside a premises, to a telecommunications network outside the premises, the apparatus comprising:
- a first module associated with the telecommunications equipment configured to be accessible from inside the premises; and
- a second module associated with the telecommunications network configured to be accessible from outside the premises, the second module including—
  - a transmitter,
  - a receiver,
  - means to encapsulate and decapsulate traffic,
  - module configuration and operation control means, and
  - means to communicate with the telecommunications equipment,
- wherein in use the first module is separated from the second module by a dividing structure and is connectable to the second module by a telecommunications link through the dividing structure.

21. Apparatus according to claim 20 further including:
- module operation error detection means;
- module operation error diagnostic means;
- module operation error testing means; and
- security means to substantially prevent unauthorized access to the module.

22. An installation at premises for connecting telecommunications equipment of the premises inside the premises to a telecommunications network outside the premises, comprising:
- a first module associated with the telecommunications equipment accessible from inside the premises;
- a second module associated with the telecommunications network accessible from outside the premises;
- wherein the first module is separated from the second module by a dividing structure, and is connected to the second module by a telecommunications link through the dividing structure, and wherein the first module is housed in a first housing, and the second module is housed in a second housing, the first housing being installed inside the premises, and the second housing being installed outside the premises, and wherein the installation comprises a closeable access aperture in the second housing permitting access to only the second module from the exterior of the premises.

23. An installation according to claim 22, wherein the premises includes a cavity wall comprising an internal wall, an external wall and a cavity between the internal wall and the external wall, the installation further including a housing to house the first module and the second module, the housing being installed in the cavity, and wherein the access means comprises a closeable access aperture in the housing permitting access to only the second module.

24. An apparatus for connecting telecommunications equipment located inside a premises, to a telecommunications network outside the premises, the apparatus comprising:
   a first module associated with the telecommunications equipment configured to be accessible from inside the premises; and
   a second module associated with the telecommunications network configured to be accessible from outside the premises and including means to terminate a cable of the telecommunications network and a transceiver;
   wherein in use the first module and the second module are mounted on opposing sides of a dividing structure to at least partially align with one another and are connectable by a telecommunications link through the dividing structure.

* * * * *